June 25, 1957  J. N. SCHUMACHER  2,796,855
MEANS IN COMBINATION WITH AN INTERNAL COMBUSTION
ENGINE FOR SUPERCHARGING THE ENGINE
Filed Sept. 23, 1955  2 Sheets-Sheet 1

INVENTOR
John N. Schumacher
BY John Mahoney
ATTORNEY

June 25, 1957     J. N. SCHUMACHER     2,796,855
MEANS IN COMBINATION WITH AN INTERNAL COMBUSTION
ENGINE FOR SUPERCHARGING THE ENGINE
Filed Sept. 23, 1955     2 Sheets-Sheet 2
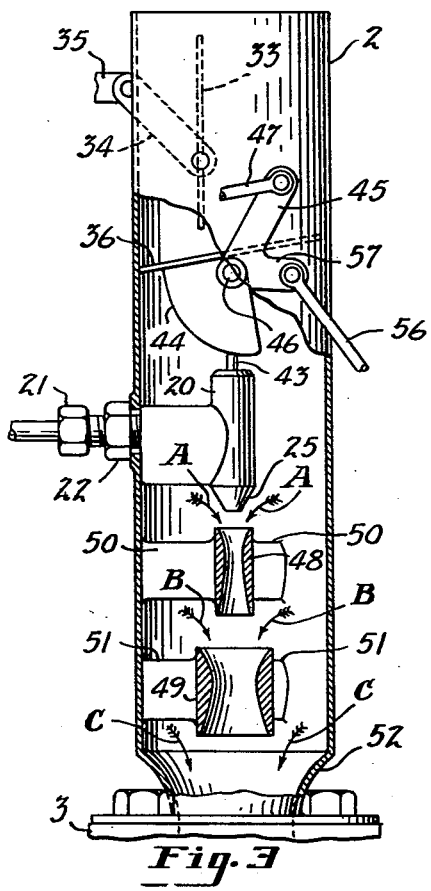
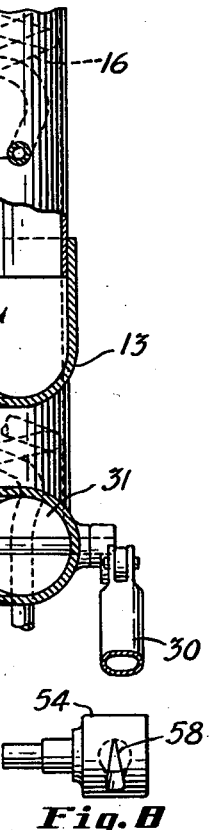
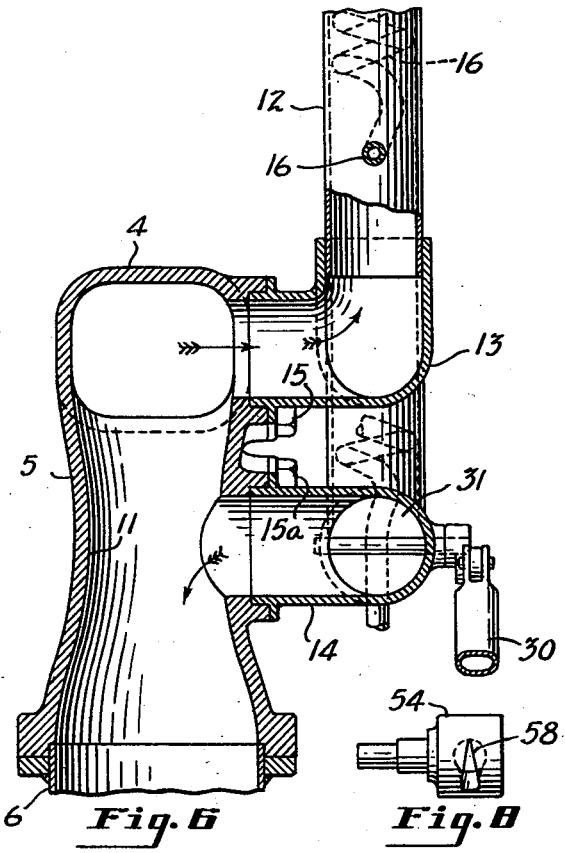
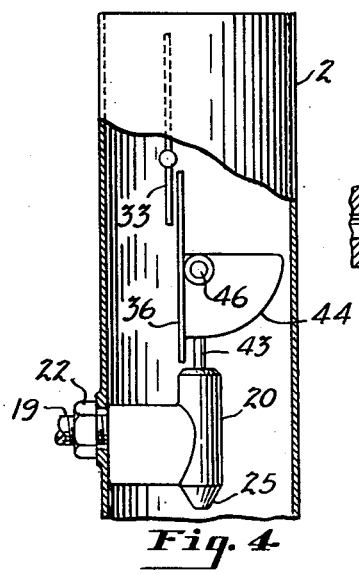
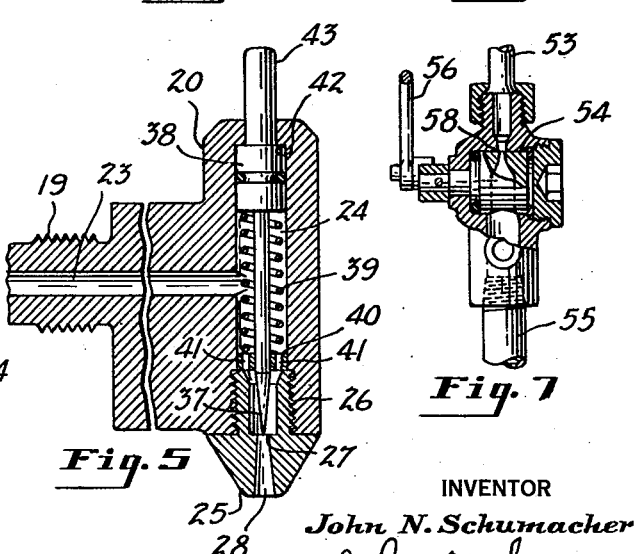
INVENTOR
*John N. Schumacher*
BY *John Mahoney*
ATTORNEY

United States Patent Office 2,796,855
Patented June 25, 1957

2,796,855

MEANS IN COMBINATION WITH AN INTERNAL COMBUSTION ENGINE FOR SUPERCHARGING THE ENGINE

John N. Schumacher, Cleveland, Ohio, assignor of fifty percent to Dan W. Duffy, Cleveland, Ohio Application September 23, 1955, Serial No. 536,250

18 Claims. (Cl. 123—133)

The present invention relates to internal combustion engines and more particularly to improved means for supercharging such engines to increase their power.

In internal combustion engines in which a fuel, such as gasoline, is utilized, it is the practice to provide a carburetor to which air and the fuel is supplied in the usual manner, such as by an air inlet pipe and a fuel pump, to form a combustible mixture of air and fuel which is drawn by the suction of the engine through the inlet manifold to the combustion chambers of the engine. In such practice, however, the mixture of air and fuel is not forced under pressure into the combustion chambers of the engine and a small portion of the fuel condenses and accumulates in the form of fine droplets or as a film on the interior surface of the inlet manifold of the engine and becomes entrained with the mixture of fuel and air flowing into the combustion chambers of the engine, thus adversely affecting the combustibility of the mixture. The condensed fuel also has the tendency to be drawn into those cylinders which are in closer relation to the carburetor than into those which are more remote therefrom, thereby providing an unequal distribution of the mixture of air and fuel in the different cylinders of the engine.

It is the aim of the present invention to provide means in combination with an internal combustion engine for heating a fuel, such as gasoline, or a mixture of gasoline and a supplementary fuel or an antiknock liquid, which if desired may be in the form of a supplementary fuel, or both, in a liquid state at a comparatively high temperature and pressure prior to its introduction into a passageway leading to the combustion chamber or combustion chambers of the engine. In accordance with the present invention, conduit means in communication with the fuel and having a comparatively small outlet orifice, is arranged in a pipe or passageway leading to the combustion chamber or combustion chambers of the engine through which the fuel flows under high pressure and which upon passing through the orifice expands into a vapor which issues from the conduit means in the form of a jet at a comparatively high pressure and velocity and means associated with the conduit means, such as one or more nozzles provided with a neck or restricted portion, are preferably provided, the inlet orifice of each of which is maintained in alignment with or substantially in alignment with the outlet orifice of the conduit means so that when a throttle valve arranged in the passageway is open, the vaporized fuel in combination with the nozzle or nozzles causes a large volume of air at high pressure and velocity to be inducted into the passageway leading to the combustion chamber or combustion chambers of the engine for increasing the power of the engine and which also prevents the fuel from condensing on the interior surface of the intake manifold of the engine.

In accordance with my invention, means associated with the conduit means and a throttle valve are also provided for simultaneously reducing or substantially terminating the supply of air and fuel to the passageway leading to the combustion chamber or combustion chambers of the engine when the throttle valve is in a partly or fully closed position, and means associated with the throttle valve and responsive to the opening and closing of the throttle valve may also be provided for mixing an antiknock liquid or a supplementary fuel, or both, with the gasoline. Means are also provided for automatically regulating the temperature and pressure of the fuel prior to the time it issues as a vapor from the outlet orifice of the conduit means.

It is therefore an object of the present invention to provide improved means in combination with an internal combustion engine for increasing the power of the engine.

Another object of the invention is to provide means in combination with an internal combustion engine for maintaining a fuel, such as gasoline, or a mixture of gasoline and an antiknock liquid or a supplementary fuel, or both, in a liquid state at comparatively high temperature and pressure and providing conduit means in communication with the fuel having a small outlet orifice arranged in an air passageway leading to the combustion chamber or combustion chambers of the engine and in which the fuel on passing through the outlet orifice expands into the form of hot vapors which mix with the air and pass at a comparatively high velocity and pressure to the combustion chamber or combustion chambers of the engine, thus increasing the power of the engine and eliminating the formation of condensed fuel vapors which adversely affect the combustibility of the mixture of air and fuel and cause an unequal distribution of the mixture of air and fuel in the different cylinders of the engine.

A further object of the invention is to provide improved means in combination with an internal combustion engine for increasing the power of the engine including means for maintaining a fuel, such as gasoline, or a mixture of gasoline and an antiknock liquid or a supplementary fuel, or both, in the liquid state at a comparatively high temperature and pressure and in which conduit means in communication with the fuel and having a comparatively small orifice is arranged in a passageway leading to the combustion chamber or combustion chambers of an internal combustion engine through which the fuel passes when a throttle valve in the passageway is open, and in which means associated with the conduit means is provided for inducting a comparatively large volume of air into the combustion chamber or combustion chambers of the engine at a comparatively high velocity and pressure to increase the power of the engine and for preventing the fuel from condensing in the form of a film or fine droplets on the interior surface of the intake manifold of the engine.

Another object of the invention is to provide improved means in combination with an internal combustion engine for increasing the power of the engine, including means for maintaining a fuel, such as gasoline, or a mixture of gasoline and an antiknock liquid or a supplementary fuel, or both, in a liquid state at a comparatively high temperature and pressure and in which conduit means in communication with the fuel and having a comparatively small outlet orifice is arranged in an air intake pipe or passageway leading to the combustion chamber or combustion chambers of the engine through which orifice the fuel may be passed and in which means are provided for regulating the temperature at which the fuel is maintained prior to its issuance from the orifice.

A still further object of the invention is to provide improved means in combination with an internal combustion engine for increasing the power of the engine including means for maintaining a fuel, such as gasoline, or a mixture of gasoline and an antiknock liquid or supplementary fuel, or both, in a liquid state at a predetermined temperature and pressure and in which conduit means provided with a comparatively small outlet orifice, is arranged in a passageway leading to the combustion chamber or combustion chambers of the engine which is in communication with the fuel when the throttle valve of the engine is open and in which means associated with the conduit means are provided for inducting a comparatively large volume of air through the passageway to the combustion chamber or combustion chambers of the engine to increase the power of the engine and to prevent the formation of condensed fuel vapors which adversely affect the combustibility of the mixture of air and fuel and cause an unequal distribution of the mixture of air and fuel in the different cylinders of the engine.

My invention will be better understood by reference to the accompanying drawings in which:

Fig. 3 is an enlarged cross sectional view of a portion of my improved apparatus, showing parts in elevation and parts broken away with the throttle valve shown in a substantially closed position;

Fig. 4 is an enlarged detail sectional view with parts in elevation showing the throttle valve in open position;

Fig. 5 is an enlarged detail cross sectional view with parts in section of a valve casing including conduit means and valve parts constituting part of my improved apparatus;

Fig. 6 is an enlarged detail cross sectional view with parts in elevation taken on a plane passing through the line 6—6 of Fig. 1, looking in the direction of the arrows;

Fig. 7 is a detail view with parts in elevation taken on a plane passing through the line 7—7 of Fig. 1; and Fig. 8 is a detail plan view of a portion of the valve shown in Fig. 7.

Figures 1, 2:
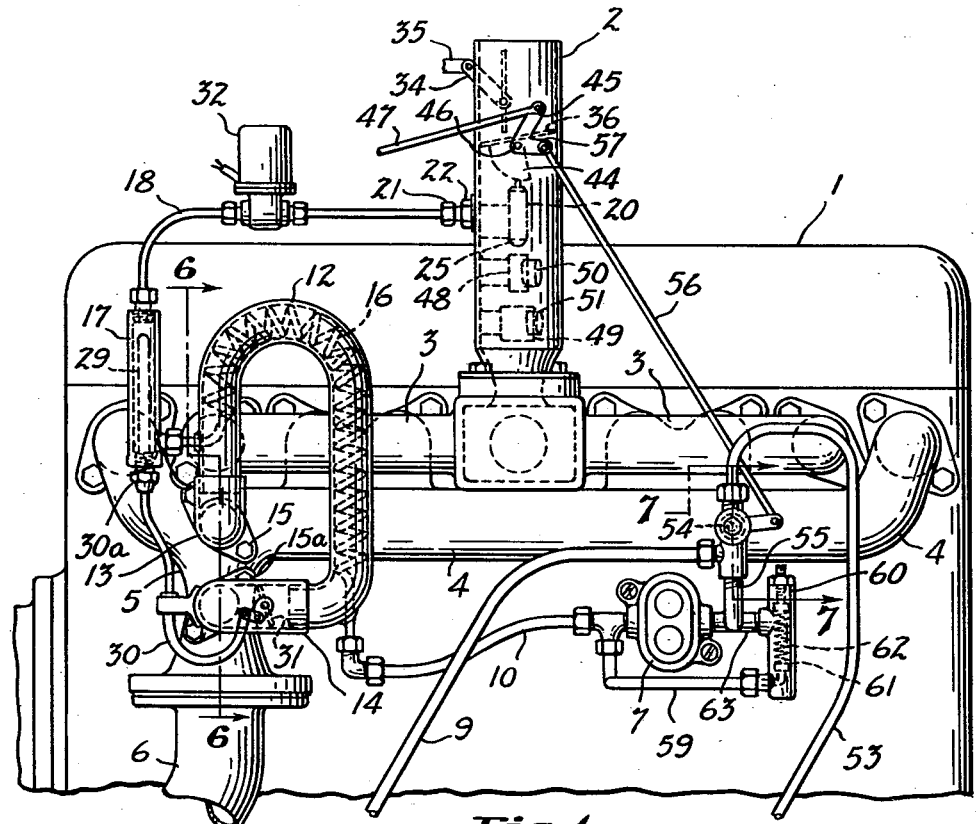
Fig. 1 is a side elevational view of a portion of an internal combustion engine showing my improved apparatus associated therewith with parts broken away.
Fig. 2 is a plan view of the apparatus shown in Fig. 1.

As shown in the drawings, the numeral 1 designates an internal combustion engine which may be of any desired type, such as stationary or movable, and which may be provided with a single or multiple combustion chambers. As illustrated, the engine is provided with a plurality of cylinders and combustion chambers to which in accordance with the present invention, a mixture of fuel and air flows at a comparatively high pressure through an inlet pipe 2, the inlet orifice of which may be provided with the usual filter or cleaner, not shown. The pipe 2 is connected to an inlet manifold 3 leading to the combustion chambers of the engine which is also provided with the usual exhaust manifold 4 which is connected by exhaust pipes 5 and 6 to the muffler and the tail pipe of the engine in the usual manner.

In accordance with the present invention, means are provided for supplying fuel, such as gasoline or a mixture of gasoline and an antiknock liquid or a supplementary fuel, or both, to the air inlet pipe or passageway leading to the combustion chamber or combustion chambers of the engine at a comparatively high temperature and pressure and passing the liquid fuel through a comparatively small orifice or opening arranged in the air inlet passage. For this purpose, a fuel pump 7 is provided having a shaft 8 which may be driven in any suitable manner, such as from the cam or crank shaft of the engine. As shown in Fig. 1, the fuel is pumped through conduit means 9 from a suitable supply tank, not shown, to the intake side of the pump and is forced through the discharge side of the pump through suitable conduit means, such as a pipe 10, and in accordance with my invention, means are provided for heating the fuel and maintaining it in a liquid state at a comparatively high temperature and pressure. For this purpose, the fuel is passed in heat exchange relation with a portion of the exhaust gases of the engine in such manner that the fuel will be heated to a comparatively high temperature while being confined under sufficient pressure to maintain the fuel in a liquid state. To regulate the amount of gases which flows in heat exchange relation with the fuel, the portion of the exhaust gases from the engine which are in heat exchange relation with the fuel may be diverted from the main exhaust pipe in any convenient manner, such as by providing a restriction in the main exhaust pipe and a branch pipe, or as shown more particularly in Figs. 1 and 6, the main exhaust pipe may be arranged in the form of a venturi tube 5 having a restricted central portion 11 and a by-pass pipe may be connected to exhaust pipe 5 in such manner that part of the exhaust gases flow through the by-pass pipe 12. For this purpose, means such as an elbow pipe 13, is connected to exhaust pipe 5 at a portion close to the entrance of the exhaust gases and a pipe section 14 is connected to the restricted portion 11 of the exhaust pipe by suitable means, such as bolts 15 and 15a, respectively, and the by-pass pipe 12 in turn is connected to the elbow pipe 13 and the pipe section 14 by a suitable means, such as welding or brazing. It will be noted that the upper portion of by-pass pipe 12 is connected to the enlarged part and the lower portion is connected to the restricted part of exhaust pipe 5 and consequently a pressure differential exists between the entrance and outlet ends of the by-pass pipe 12 and for heating the fuel and maintaining it at a comparatively high temperature, conduit means 16 having one end connected to the discharge pipe 10 extends through the by-pass pipe 12 to which it may be secured in a suitable manner, such as by welding, and is preferably in the form of a coil to provide a comparatively large surface which is in heat exchange relation with the exhaust gases passing through by-pass pipe 12. The outlet portion of conduit means 16 is also secured to the by-pass pipe 12 by suitable means, such as welding, and is connected to a casing 17 which, in turn, is connected by conduit means 18 to the stem 19 of a valve casing 20 arranged within the inlet pipe 2 by suitable means, such as a coupling 21. The stem 19 of valve casing 20 extends loosely through an aperture in pipe 2 and is held in place by a nut 22 which engages the outer surface of pipe 2 to permit a small vertical adjustment of the valve casing, it being understood that pipe 18 is flexible enough to permit of this adjustment.

Valve casing 20 is provided with inlet conduit means 23 which extends through stem 19 and is in communication with conduit means 18 and a chamber 24 arranged in valve casing 20. Valve casing 20 is also provided with a nozzle 25 having a cylindrical stem 26 provided with a central opening which is in threaded engagement with the lower portion of valve casing 20 in alignment with the chamber 24 and is provided with a comparatively small outlet orifice 27 which communicates with an opening 28 in nozzle 25 which may be of any desired shape, such as cylindrical. As shown, it is conical in shape to slightly relieve the pressure upon the liquid fuel as it flows through the opening. According to the present invention, the orifice 27 is of insufficient size to relieve the pressure in conduit means 16, casing 20, and conduit means 18 and 23 caused by the force of pump 7 and consequently the fuel within the heating system will be maintained in the liquid state at a comparatively high temperature and pressure. When the liquid fuel flows through opening 28, however, the pressure upon the fuel is somewhat relieved and upon issuing from opening 28, the pressure upon the liquid is completely released and the liquid fuel immediately vaporizes and issues from opening 28 in the form of a jet.

In accordance with the present invention, means are provided for regulating the temperature to which the fuel is heated in by-pass pipe 13 and for this purpose, a bulb 29 is arranged in casing 17 which is connected to one end of a Bourdon tube 30 by suitable means, such as a nut 30a. The other end of Bourdon tube 30 is connected to a valve 31 arranged adjacent the outlet opening in by-pass pipe 12 or as shown, it may be arranged in the pipe section 14 which is connected to exhaust pipe 5. The bulb 29 is in heat exchange relation with the fuel flowing through casing 17 and contains an expansible gas or liquid which when heated to a sufficient temperature moves Bourdon tube 30 to a sufficient extent to cause it to close or partly close valve 31, thereby limiting or terminating the flow of exhaust gases through by-pass pipe 12 to limit the temperature to which the fuel is heated. On the other hand, when the liquid or gas within the Bourdon tube condenses or contracts, the Bourdon tube contracts and opens or partly opens valve 31, thus increasing the flow of exhaust gases through by-pass pipe 12 to increase the temperature to which the fuel in conduit means 16 is heated. A solenoid actuated valve 32 is also arranged in conduit means 18 which is normally maintained in closed position by suitable means, such as a spring, not shown, and which is actuated when the solenoid is energized. The solenoid in valve 32 may, for instance, be connected to the ignition system of the engine so that when the ignition is turned on, the solenoid is energized to move the valve to an open position, thus permitting fuel to flow through conduit means 18 to the valve casing 20. A butterfly valve 33 may also be provided in the air inlet pipe 2 to which an arm 34 is connected which may be actuated by a rod 35 in the usual manner to choke or limit the amount of air that flows through the inlet pipe 2 during starting of the engine.

A throttle valve 36 is also arranged within conduit means 2 for regulating the amount of air that flows to the combustion chamber or combustion chambers of the engine and means associated with the throttle valve is provided for also regulating the amount of fuel that flows through nozzle 25. While any suitable means may be provided for this purpose, as illustrated in the drawings, a needle valve 37 is arranged in the chamber 24 of valve casing 20 which is provided at its upper end with a piston 38 and is normally held in open position relative to orifice 27 by the pressure of the fuel within the system which pressure may be assisted, if desired, by a spring 39, one end of which abuts against a bushing 40 arranged in chamber 24 in seating engagement with the stem of nozzle 25 and the other end of which engages the lower portion of piston 38. Bushing 40 is provided with a central opening through which one end of the needle valve 37 extends and with a plurality of spaced openings 41 through which the liquid fuel flows through the central opening in the stem 26. Piston 38 is reduced at its upper end to provide a shoulder 42 for engaging the upper end of casing 20 and a rod 43 which extends through an opening in the upper end of the casing and means associated with throttle valve 36 is provided for simultaneously closing or substantially closing the throttle valve and the outlet orifice 27 and while any suitable means may be provided for this purpose, as shown in the drawings, a cam 44 is secured to throttle valve 38 by suitable means, such as welding, and a bell crank lever 45, in turn, is secured to cam 44 by means, such as a rivet 46, and when the throttle valve is in its open position as shown in Figs. 4 and 5, and the ignition system of the engine is turned on, the solenoid in valve 32 is energized to open valve 32 and the needle valve 37 is in its open position relative to orifice 27 and liquid fuel passes through orifice 27 and issues in the form of a vapor from opening 28 and air is drawn into the passage through the air intake pipe 2. Because the vapors issuing from opening 28 are hot, when they pass to the combustion chamber or combustion chambers of the engine, condensation of the fuel in the intake manifold of the engine is therefore minimized or substantially eliminated. Cam 44 is so shaped that in any position of the throttle, the proper portion of air and fuel will flow to the combustion chamber or combustion chambers of the engine.

The throttle valve may be opened and substantially closed by any suitable means, such as a rod 47, which is connected to one arm of bell crank lever 45 and when the throttle valve is in its substantially closed or partly closed position, cam 44 engages rod 43 and actuates needle valve 37 to close or partly close orifice 27 and the needle valve may be tapered at its free end to such shape that the proper proportion of air and fuel is provided in the combustion chamber or combustion chambers of the engine. Casing 20 may also be adjusted vertically and maintained in the desired position by nut 22 in the manner previously described to provide the desired proportion of air and fuel that flows to the combustion chamber or combustion chambers of the engine. It will of course be understood that means may be provided in the usual manner for preventing the complete closing of the throttle valve. When the throttle valve is in a substantially closed position, needle valve 37 will therefore be in a slightly open position so that a sufficient mixture of air and fuel is provided to the combustion chamber or combustion chambers of the engine to permit the engine to idle when it is not under load. When the ignition is turned off, however, valve 32 closes and prevents additional fuel from passing into the chamber 24 of valve casing 20 and through the outlet orifice 27.

In accordance with the present invention, means are also provided to induct a comparatively large volume of air into the pipe or air passageway 2 when the throttle valve is open to increase the pressure and velocity of the air and fuel passing to the combustion chamber or combustion chambers of the engine and for this purpose, one or more nozzles 48 and 49 are arranged in the passageway provided by pipe 2. As shown, nozzles 48 and 49 are in the form of venturi tubes and are arranged in alignment with the opening 28 in nozzle 25 through which the fuel vapors issue and are supported in place in the passageway by suitable means, such as thin vanes 50 and 51, respectively. The inlet orifice of venturi tube 48 is also preferably spaced from nozzle 25 and the inlet orifice of venturi tube 49 is preferably spaced from the outlet orifice of venturi tube 48 although if desired, the outlet orifice of venturi tube 48 may be arranged substantially even with nozzle 25 and the inlet orifice of venturi tube 49 may be arranged substantially even with the outlet orifice of venturi tube 48. It will also be noted that the inlet pipe 2 which is connected to the inlet manifold 3 of the engine is also in the form of a nozzle 52 and consequently when the throttle valve 36 is open, fuel in the form of vapors issues from nozzle 25 and a comparatively large volume of air is inducted into venturi tube 48 as indicated by the arrows A. The mixture of air and fuel issuing from venturi tube 48 also causes a comparatively large volume of air to be inducted into venturi tube 49 as indicated by the arrows B. The mixture of air and fuel passing from the outlet orifice tube 48 into the nozzle or venturi-shaped portion 52 of pipe 2 also causes a comparatively large volume of air to be inducted into the pipe 52 as indicated by the arrows C and consequently a large volume of air and fuel at high pressure and velocity flows into the combustion chamber or combustion chambers of the engine and the proper proportion of air and fuel to provide the desired combustible mixture may be provided by the shape of cam 44, the needle valve 31, or by adjusting the valve casing 20 to increase or decrease the amount of fuel vapors that flow into the combustion chamber or combustion chambers of the engine and it is therefore not necessary in my improved structure to provide a carbureter of the usual type.

In accordance with the present invention, means are also provided for mixing an antiknock liquid or a supplementary fuel, or both, or an antiknock liquid that serves as a supplementary fuel, such as ethyl or butyl alcohol, into the system. For this purpose, a pipe 53 leads from a suitable source of the antiknock liquid or supplementary fuel, or a mixture thereof, and is pumped into the system through a metering valve 54 which is connected to conduit means 55 leading to the intake side of pump 7 and means, such as a rod 56 has one end connected to the valve 54 and its opposite end connected to a second arm 57 on the bell crank lever 45 and the opening in valve 54 is shaped in such manner that when the throttle valve 36 is opened, the antiknock liquid or supplementary fuel, or a mixture of both, is introduced into the system. For this purpose, rod 56 is so arranged that when the throttle valve 36 is substantially closed, valve 54 is also closed. When throttle valve 36 is opened, however, rod 56 which is connected thereto opens valve 54 and as shown more particularly in Fig. 8, valve 54 is provided with a V-shaped opening 58 so that as valve 54 is turned by rod 56, the amount of antiknock liquid or supplementary fuel, or mixture thereof, that is drawn into the system is increased as the throttle valve is opened. The amount of antiknock liquid or supplementary fuel that is pumped into the system will of course depend upon the type of gasoline that is utilized and the purpose for which the engine is to be utilized.

To prevent undue pressure from developing in the system, a by-pass pipe 59 connected to the discharge pipe 10 is provided as shown in Fig. 1 which is connected at its other end to a valve casing 60 and which is normally closed by a valve part 61 which is held on its seat by suitable means, such as a spring 62. In the event the pressure within the system increases beyond a predetermined amount, however, valve part 61 is moved from its seat against the force of spring 62 and a portion of the liquid from the discharge side of the pump passes through pipe 59, valve casing 60, and a return pipe 63 which is connected to the intake side of pump 7.

What is claimed is:

1. In combination with an internal combustion engine having a combustion chamber therein, means for providing an air inlet passageway leading from the atmosphere to the combustion chamber of the engine, means for heating and maintaining a fuel in a liquid state at a comparatively high temperature and pressure, conduit means arranged in said air inlet passageway, said conduit means being in communication with said fuel and being provided with a small outlet opening arranged to direct fuel from said conduit means through said air inlet passageway to the combustion chamber of the engine, and the outlet opening of said conduit means being of a size insufficient to release the pressure upon said fuel to a sufficient extent to permit the fuel to vaporize so that the fuel will flow through the outlet opening of the conduit means in the liquid state and will issue from said outlet opening in a vaporous state at a high velocity in the form of a jet to provide a mixture of air and hot vaporized fuel which passes to the combustion chamber of said engine.

2. In combination with an internal combustion engine having a combustion chamber therein, means for providing an inlet passageway leading from the atmosphere to the combustion chamber of the engine, a throttle valve arranged in said inlet passageway, means for heating and maintaining a fuel in the liquid state at a comparatively high temperature and pressure, conduit means arranged in said air inlet passageway, said conduit means being in communication with said fuel and being provided with an outlet opening of a size insufficient to release the pressure upon said fuel to a sufficient extent to permit the fuel to vaporize, means associated with said throttle valve and the outlet opening of said conduit means for regulating the amount of liquid that flows through the outlet opening of said conduit means to provide the proper mixture of air and fuel at any desired position of the throttle valve, and the opening in said conduit means being directed toward the combustion chamber of the engine so that the fuel will flow through the outlet opening of the conduit means in the liquid state and will issue from said outlet opening in a vaporous state at a high velocity in the form of a jet to provide a mixture of air and hot vaporized fuel which passes to the combustion chamber of said engine.

3. In combination with an internal combustion engine having a combustion chamber therein, means for providing an air inlet passageway leading from the atmosphere to the combustion chamber of the engine, means for providing a passageway for the exhaust gases from said engine, means containing a liquid fuel for said engine arranged in heat exchange relation with exhaust gases from the engine whereby said fuel is heated to a comparatively high temperature, means for maintaining said fuel in a liquid state under pressure, conduit means arranged in said air inlet passageway, said conduit means being in communication with said fuel and being provided with an outlet opening arranged to direct fuel from said conduit means through said air inlet passageway toward the combustion chamber of the engine, and the outlet opening of said conduit means being of a size insufficient to release the pressure upon said fuel to a sufficient extent to permit the fuel to vaporize so that the liquid fuel will flow through the outlet opening of the conduit means in the liquid state at a high velocity in the form of a jet to provide a mixture of air and hot vaporized fuel which passes to the combustion chamber of said engine.

4. In combination with an internal combustion engine having a combustion chamber therein, means for providing an air inlet passageway leading from the atmosphere to the combustion chamber of the engine, means for providing a passageway for the exhaust gases from the engine, means for diverting a portion of the exhaust gases from the engine, means for passing a liquid fuel for said engine in heat exchange relation with the diverted portion of said exhaust gases for heating said fuel to a comparatively high temperature, means for maintaining the heated fuel in the liquid state at high pressure, a throttle valve arranged in said passageway, conduit means arranged in said air inlet passageway, said conduit means being in communication with said fuel and being provided with an outlet opening of a size insufficient to release the pressure upon said fuel to a sufficient extent to permit the fuel to vaporize, means associated with said throttle valve and the outlet opening of said conduit means for regulating the amount of liquid that flows through the outlet opening of said conduit means to provide the proper mixture of air and fuel at any desired position of the throttle valve, and the opening in said conduit means being directed toward the combustion chamber of the engine so that the fuel will flow through the outlet opening of the conduit means in the liquid state and will issue from said outlet opening in a vaporous state at a high velocity in the form of a jet to provide a mixture of air and hot vaporized fuel which passes to the combustion chamber of said engine.

5. In combination with an internal combustion engine having combustion chambers therein, means for providing an inlet passageway from the atmosphere to the combustion chambers of the engine, means for providing a passageway for the exhaust gases from the engine including a main exhaust pipe having an enlarged portion through which exhaust gases enter and a restricted portion spaced therefrom, a by-pass pipe having one end connected to the enlarged portion of the main exhaust pipe at a point arranged in proximity to the entrance of the exhaust gases and its other end connected to the main exhaust pipe at its restricted portion to provide a differential in pressure between the inlet and outlet ends of the by-pass pipe, means for passing a liquid fuel for said engine in heat exchange relation with the exhaust gases flowing through the by-pass pipe, means for maintaining the fuel under pressure, means in heat exchange relation with the heated fuel which is responsive to the temperature of the fuel for regulating the amount of exhaust gases which pass through the by-pass pipe, a throttle valve arranged in said passageway, conduit means arranged in said passageway which is in communication with said fuel and said conduit means being provided with a small outlet opening through which said fuel may flow and from which it issues in the vaporous state at high velocity in the form of a jet when the throttle valve is at least partly open.

6. In combination with an internal combustion engine having a combustion chamber therein, means for providing an air inlet passageway leading from the atmosphere to the combustion chamber of said engine, means for heating and maintaining a fuel for said engine in a liquid state at a comparatively high temperature and pressure, a throttle valve arranged in said passageway, conduit means arranged in said passageway which is in communication with said fuel, said conduit means being provided with a small outlet opening through which said fuel may flow and from which it issues in the vaporous state at high velocity in the form of a jet when the throttle valve is at least partly open, and means associated with said conduit means and arranged in said passageway for inducting a comparatively large volume of air into said passageway for increasing the power of the engine.

7. In combination with an internal combustion engine having combustion chambers therein, means for providing an air inlet passageway leading from the atmosphere to the combustion chambers of the engine, means for heating and maintaining a fuel for said engine in a liquid state at a comparatively high temperature and pressure, a throttle valve arranged in said passageway, conduit means arranged in said passageway which is in communication with said fuel and said conduit means being provided with an outlet opening through which said fuel flows and from which it issues in the vaporous state at high veloocioty in the form of a jet when the throttle valve is at least partly open, and a nozzle having an inlet orifice arranged in alignment with vaporous fuel issuing from said opening and a restricted portion for inducting a comparatively large amount of air at high pressure and velocity into said passageway for increasing the power of the engine.

8. In combination with an internal combustion engine having combustion chambers therein, means for providing an air inlet passageway leading from the atmosphere to the combustion chambers of the engine, means for heating and maintaining a fuel for said engine in a liquid state at a comparatively high temperature and pressure, a throttle valve arranged in said passageway, conduit means arranged in said passageway which is in communication with said fuel and said conduit means being provided with a small outlet opening through which said fuel flows and from which it issues in the vaporous state at high velocity in the form of a jet when the throttle valve is at least partly open, and a plurality of nozzles, each having an outlet orifice and a reduced portion, and said nozzles being arranged in alignment with each other and with the vaporous fuel issuing from said opening for inducting a comparatively large volume of air at comparatively high pressure and velocity into said passageway to increase the power of the engine.

9. In combination with an internal combustion engine having a combustion chamber therein, means including a pipe having an air inlet passageway leading from the atmosphere to the combustion chambers of the engine, means for heating and maintaining a fuel for said engine in a liquid state at a comparatively high temperature and pressure, a throttle valve arranged in said passageway, conduit means arranged in said passageway which is in communication with said fuel and said conduit means being provided with a small outlet opening through which said fuel flows and from which it issues in the vaporous state at high velocity in the form of a jet when the throttle valve is at least partly open, and said pipe being provided with an inlet orifice and a restricted portion arranged beyond and in alignment with the outlet opening in said conduit means for inducting a large volume of air at a comparatively high pressure and velocity into said passageway to increase the power of the engine.

10. In combination with an internal combustion engine having combustion chambers therein, means including a pipe having an air inlet passageway leading from the atmosphere to the combustion chambers of the engine, means for heating and maintaining a fuel for said engine in a liquid state at a comparatively high temperature and pressure, a throttle valve arranged in said passageway, conduit means arranged in said passageway which is in communication with said fuel and said conduit means being provided with an outlet orifice through which said fuel flows and from which it issues in the vaporous state at high velocity in the form of a jet when the throttle valve is at least partly open, said pipe having a restricted portion arranged in alignment with and extending beyond the outlet orifice of said conduit means, and means associated with said conduit means and arranged in said passageway for inducting a comparatively large volume of air into said passageway for increasing the power of said engine, and said air inducting means including the restricted portion of said pipe and a nozzle having inlet and outlet openings arranged in alignment with the orifice of said conduit means and the restricted portion of said pipe.

11. In combination with an internal combustion engine having combustion chambers therein, means including a pipe having an air inlet passageway leading from the atmosphere to the combustion chambers of the engine, means for heating and maintaining a fuel for said engine in a liquid state at a comparatively high temperature and pressure, a throttle valve arranged in said passageway, conduit means arranged in said passageway which is in communication with said fuel and said conduit means being provided with an outlet opening through which said fuel flows and from which it issues in the vaporous state at high velocity in the form of a jet when the throttle valve is at least partly open, and said pipe having a restricted portion arranged in alignment with and extending beyond the outlet opening of said conduit means, and means associated with said conduit means and arranged in said passageway for inducting a comparatively large volume of air into said passageway for increasing the power of said engine, and said air inducting means including the restricted portion of said pipe and a plurality of nozzles, each having a restricted portion and inlet and outlet orifices arranged in alignment with the outlet opening of said conduit means.

12. In combination with an internal combustion engine having combustion chambers therein, means for providing an air inlet passage leading from the atmosphere to the combustion chambers of the engine, means for heating and maintaining a fuel for said engine in a liquid state at a comparatively high temperature and pressure, conduit means arranged in said passageway which is in communication with said fuel and said conduit means being provided with an outlet orifice which is of insufficient size to relieve the pressure upon the fuel to a sufficient extent to permit the fuel to vaporize, a throttle valve arranged in said passageway, means associated with said throttle valve for substantially closing the orifice in said conduit means when the throttle valve is substantially closed, and the pressure of said fuel being effective in maintaining said closing means in spaced relation to said orifice when the throttle valve is in its open position to permit liquid fuel to flow through the orifice and issue therefrom in the vaporous state at high velocity in the form of a jet.

13. The combination as specified in claim 12 in which the means associated with the throttle valve for closing the orifice are a valve part and a cam in which the cam is secured to the throttle valve and engages the valve part when the throttle valve is moved from its closed to its open position, and said cam part being so shaped that when the throttle valve is moved from its closed to its open position, the fuel passing through said orifice will be in the proper proportion to the air entering the passageway to provide a combustible mixture of air and fuel for passage to the combustion chambers of the engine at any position of the throttle valve.

14. The combination as specified in claim 12 in which the means associated with the throttle valve for closing the orifice is a valve part having a tapered free end portion and a cam which is movable with the throttle valve and in which the taper on the free end portion of the valve part is so shaped that during the movement of the throttle valve from its closed to its open position, the taper upon the valve part will be so positioned in the orifice that a proper mixture of air and fuel will be provided for passage to the combustion chambers of the engine at any position of the throttle valve.

15. In combination with an internal combustion engine having combustion chambers therein, means for providing an air inlet passageway leading from the atmosphere to the combustion chambers of the engine, means for heating and maintaining a fuel in a liquid state at a comparatively high temperature and pressure, a throttle valve arranged in said passageway, conduit means arranged in said passageway which is in communication with said fuel and said conduit means being provided with an outlet opening through which said fuel may flow and from which it issues in the vaporous state at high velocity in the form of a jet when the throttle valve is in at least a partly open position, and means in response to the opening of the throttle valve for mixing an additional liquid with the fuel in an amount depending upon the position of the throttle valve.

16. The combination specified in claim 15 in which the additional liquid is in the form of a supplementary fuel.

17. The combination as specified in claim 15 in which the additional liquid is an antiknock liquid.

18. The combination as specified in claim 15 in which the additional liquid is an antiknock liquid which also serves as a supplementary fuel.

References Cited in the file of this patent

UNITED STATES PATENTS

| | | |
|---|---|---|
| 1,893,682 | Rosier | Jan. 10, 1933 |
| 2,254,634 | Tomsic | Sept. 2, 1941 |